United States Patent
Hamano et al.

(10) Patent No.: US 6,972,909 B2
(45) Date of Patent: Dec. 6, 2005

(54) ZOOM LENS AND IMAGE PICKUP APPARATUS HAVING THE SAME

(75) Inventors: Hiroyuki Hamano, Ibaraki-ken (JP); Nobuyuki Miyazawa, Tochigi-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/064,532

(22) Filed: Feb. 24, 2005

(65) Prior Publication Data
US 2005/0190458 A1    Sep. 1, 2005

(30) Foreign Application Priority Data
Feb. 26, 2004    (JP) .............................. 2004-052204

(51) Int. Cl.[7] .............................................. G02B 15/14
(52) U.S. Cl. ..................... 359/687; 359/683; 359/684; 359/685; 359/686; 359/688; 359/740; 359/763; 359/765; 359/774
(58) Field of Search ................... 359/676, 683–686, 359/688, 740, 763, 765, 774

(56) References Cited

U.S. PATENT DOCUMENTS

| | | | |
|---|---|---|---|
| 5,424,869 A | | 6/1995 | Nanjo |
| 6,118,593 A | | 9/2000 | Tochigi |
| 6,535,339 B1 | * | 3/2003 | Miyauchi ................... 359/687 |
| 6,714,355 B2 | * | 3/2004 | Miyauchi ................... 359/687 |
| 2002/0063961 A1 | * | 5/2002 | Hamano et al. ............ 359/557 |
| 2003/0072087 A1 | * | 4/2003 | Horshi ........................ 359/687 |
| 2003/0081323 A1 | * | 5/2003 | Horiuchi .................... 359/687 |
| 2003/0189763 A1 | * | 10/2003 | Horiuchi .................... 359/687 |

FOREIGN PATENT DOCUMENTS

| | | |
|---|---|---|
| JP | 4-43311 | 2/1992 |
| JP | 5-72472 | 3/1993 |
| JP | 6-34882 | 2/1994 |
| JP | 8-82743 | 3/1996 |
| JP | 8-160299 | 6/1996 |
| JP | 2000-89116 | 3/2000 |
| JP | 2000-121941 | 4/2000 |

* cited by examiner

Primary Examiner—Evelyn A. Lester
(74) Attorney, Agent, or Firm—Morgan & Finnegan, LLP

(57) ABSTRACT

The zoom lens has, in order from the object to image sides, a first lens unit having a positive refractive power, a second lens unit having a negative refractive power, a third lens unit having a positive refractive power, and a fourth lens unit having a positive refractive power, wherein the second lens unit and the fourth lens unit move during zooming. The following condition is satisfied:

$\nu 23 < 20.0$, $N23 > 1.9$, $-1.0 < f2/ft < -0.05$, where f2 represents a focal length of the second lens unit, ft represents a focal length of the entire system at a telephoto end zoom position, and $\nu 23$ and $N23$ represent an Abbe number and a refractive index of the material forming the third lens of the second lens unit, respectively.

8 Claims, 6 Drawing Sheets

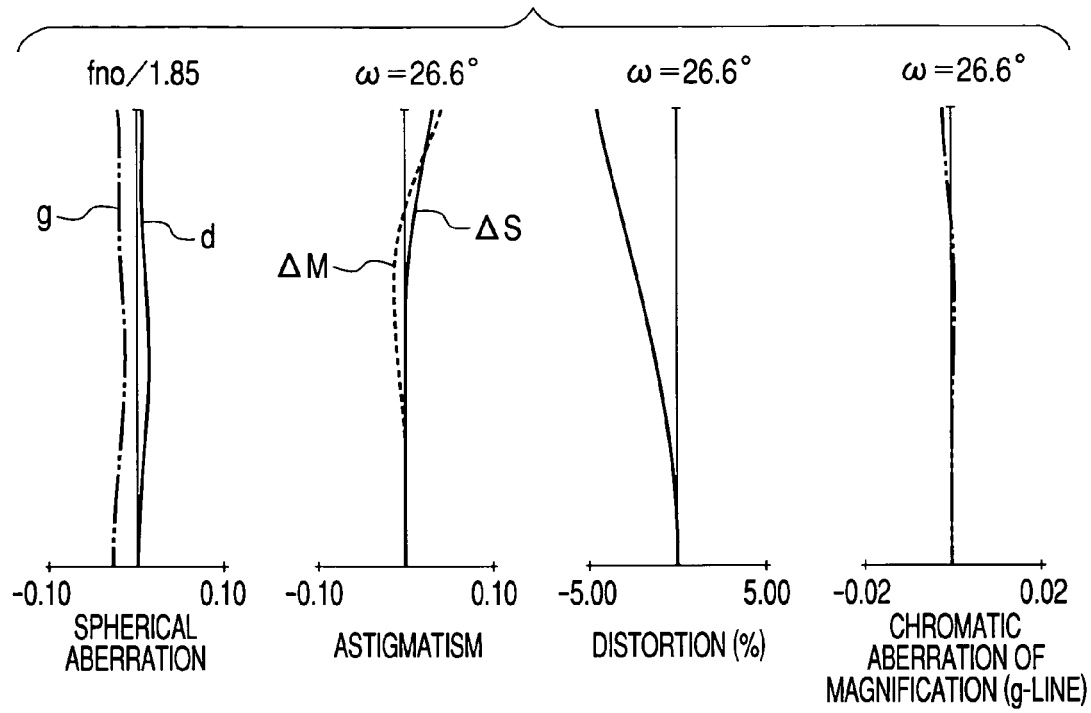
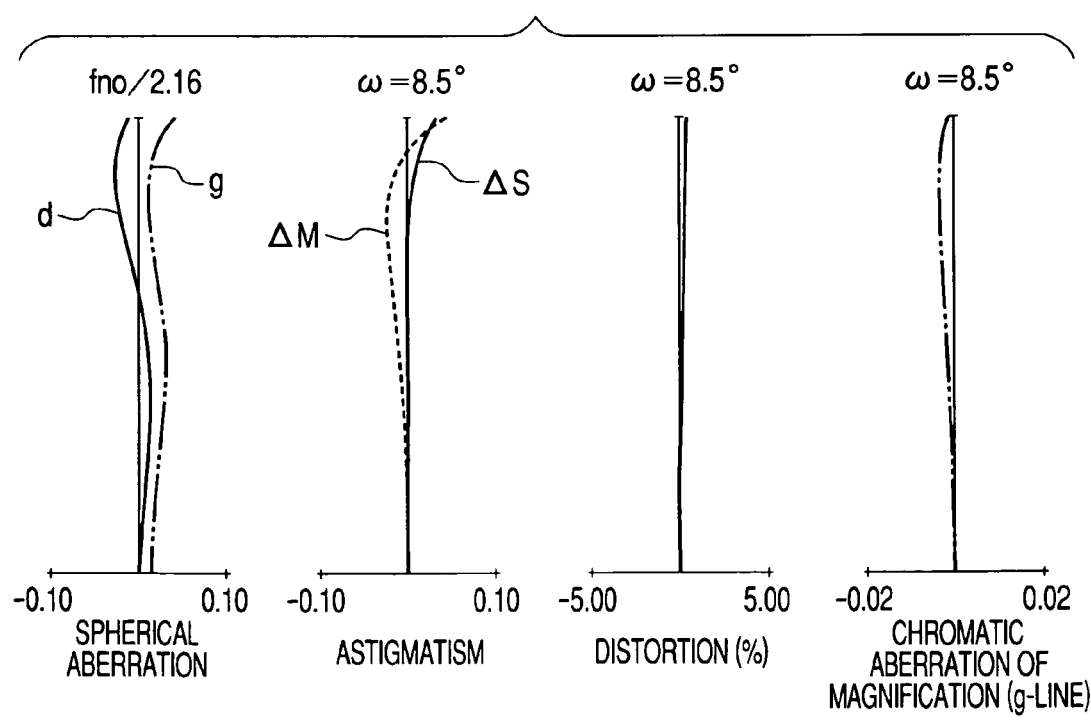

ZOOM LENS AND IMAGE PICKUP APPARATUS HAVING THE SAME

BACKGROUND OF THE INVENTION

1. Field of the Invention

The present invention relates to a zoom lens suitable for use in a still camera, a video camera, a silver-halide film camera, a digital still camera, or the like, and to an image pickup apparatus having the zoom lens.

2. Related Background Art

In recent years, as the functionality of image pickup apparatuses such as a video camera, a digital still camera, or a silver-halide film camera that uses a solid-state image pickup element expands, a demand for a compact and high-resolution zoom lens as a photographing optical system for use in such image pickup apparatuses has been growing.

As a zoom lens that meets this demand, there is known a four-unit zoom lens of a so-called rear focus type having, in order from object side to image side, a first lens unit having a positive refractive power, a second lens unit having a negative refractive power, a third lens unit having a positive refractive power, and a fourth lens unit having a positive refractive power; the second lens unit is moved to provide variable magnification, and the fourth lens unit corrects image plane variations accompanying the variations in magnification, thereby performing focusing (Japanese Patent Application Laid-Open Nos. H04-043311, H05-072472, and H06-034882).

As compared with a zoom lens that effects focusing through movement of the first lens unit, such a rear focus type zoom lens generally involves a reduced effective diameter of the first lens unit, thus facilitating miniaturization of the entire lens system.

Such a rear focus type zoom lens enables short-range photography, and further, involves movement of a relatively small and lightweight lens unit, whereby a small drive force suffices to drive the lens unit, thus enabling quick focusing. With an optical system of this type, an attempt to maintain compactness while increasing the zoom ratio results in the difficulty to correct variations in chromatic aberration of magnification during zooming.

In this regard, there are known zoom lenses of a four-unit zoom lens construction whose second lens unit has a negative refractive power lens arranged at the most image side thereof, the second lens unit as a whole consisting of three negative refractive power lenses and one positive refractive power lens, thereby correcting chromatic aberration of magnification during zooming in a satisfactory manner (Japanese Patent Application Laid-Open Nos. H08-082743 and 2000-089116).

There are also known zoom lenses of a four-unit zoom lens construction in which a high-dispersion glass material with an Abbe number υd on the order of 21 is used as the material of a positive refractive power lens of the second lens unit, thereby achieving miniaturization of the entire optical system (Japanese Patent Application Laid-Open Nos. H08-160299 and 2000-121941).

In recent years, with the increasingly smaller size of image pickup apparatuses and higher-density pixel integration of image pickup elements, there is a demand for a zoom lens allowing both high optical performance and a small overall zoom system size as a zoom lens for use in a digital still camera, a video camera, or the like. Also desired is the ability to record still images with high image quality using video cameras, which leads to a demand for a lens system that provides high optical performance while being compact at the same time.

In Japanese Patent Application Laid-Open No. H08-082743, the second lens unit consists of four lenses. Although this construction is advantageous for aberration corrections, the fact that the number of lenses is four means that the total lens length tends to increase accordingly.

Although the construction of Japanese Patent Application Laid-Open No. H08-160299 involves a small number of lenses constituting the second lens unit, the lens system as a whole has a large number of lenses, with the result that the overall size of the lens system tends to increase. Further, the construction of Japanese Patent Application Laid-Open No. 2000-121941, in which the second lens unit consists of a cemented lens of a positive lens and a negative lens, tends to reduce the degree of freedom in design.

On the other hand, a zoom lens adopting a so-called rear focus system, in which focusing is effected by a lens unit other than the first lens unit, allows a reduction in the overall size of the lens system. Such a construction, however, increases variations in aberration during focusing, making it difficult to attain high optical performance over the entire object distance range from an object at infinity to an object at short distance.

SUMMARY OF THE INVENTION

It is an object of the present invention to provide a zoom lens that provides optical performance sufficiently high for applications that use a solid-state image pickup element of a simple construction having a high variable power ratio and consisting of a large number of pixels, and an image pickup apparatus having such a zoom lens.

According to one aspect of the invention, a zoom lens includes, in order from an object side to an image side: a first lens unit having positive optical power; a second lens unit having negative optical power; a third lens unit having positive optical power; and a fourth lens unit having positive optical power, wherein the second lens unit and the fourth lens unit move during zooming, wherein the second lens unit consists of, in order from the object side to the image side, a lens 21 having a negative refractive power in which absolute value of refractive power in an image-side surface is larger than that in an object-side surface, a lens 22 having a negative refractive power and whose object-side surface is concave, and a lens 23 having a positive refractive power in which absolute value of positive refractive power in an object-side surface is larger than that in an image-side surface, and wherein with air intervening between the lens 22 and the lens 23, the following condition is satisfied:

$$\upsilon 23 < 20.0,$$

$$N23 > 1.9,$$

$$-0.1 < f2/f2t < -0.05,$$

where f2 represents a focal length of the second lens unit, ft represents a focal length of the entire system at a telephoto end zoom position, and υ23 and N23 represent an Abbe number and a refractive index of a material forming the lens 23, respectively.

The present invention can provide a zoom lens that provides optical performance sufficiently high for applications that use a solid-state image pickup element of a simple construction having a high magnification ratio and high-density pixel integration, and an image pickup apparatus having such a zoom lens.

Other various aspects of the present invention will become apparent upon reading its Embodiments described below.

BRIEF DESCRIPTION OF THE DRAWINGS

FIG. 5 illustrates various aberrations at a wide-angle end of a zoom lens according to Embodiment 2 of the present invention;

FIG. 6 illustrates various aberrations at an intermediate zoom position of the zoom lens according to Embodiment 2;

DESCRIPTION OF THE PREFERRED EMBODIMENTS

Embodiment 1

Hereinafter, a zoom lens and an image pickup apparatus having the same according to an embodiment of the present invention are described.

Figure 1:
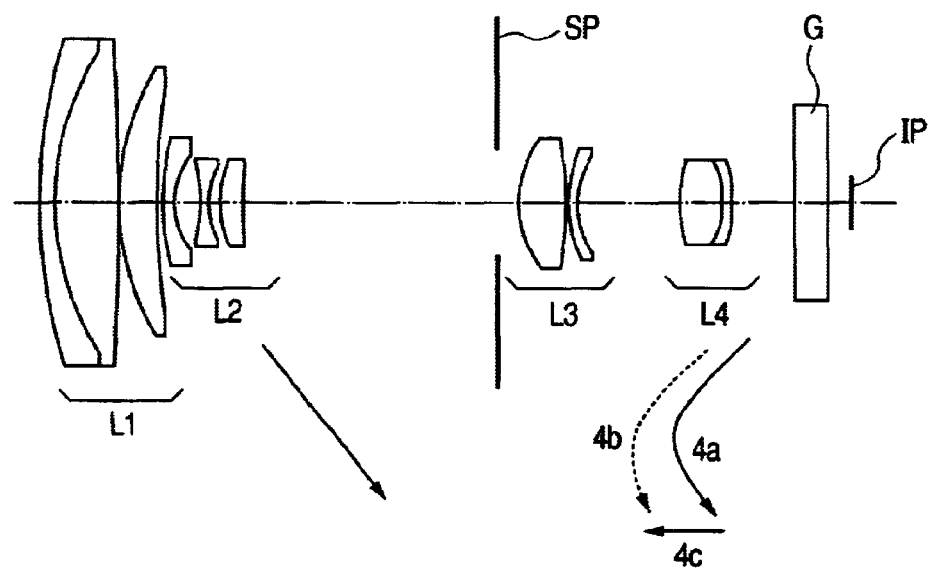
FIG. 1 illustrates a lens cross section at a wide angle end of a zoom lens according to Embodiment 1 of the present invention.
Figure 2:
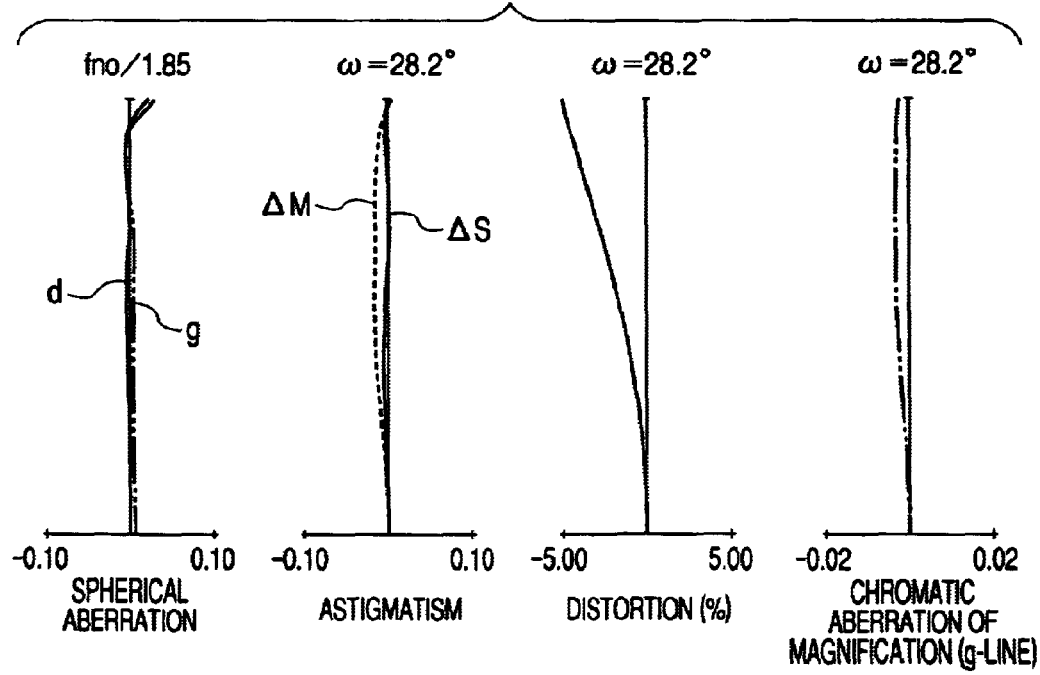
FIG. 2 illustrates various aberrations at the wide-angle end of the zoom lens according to Embodiment 1.
Figure 3:
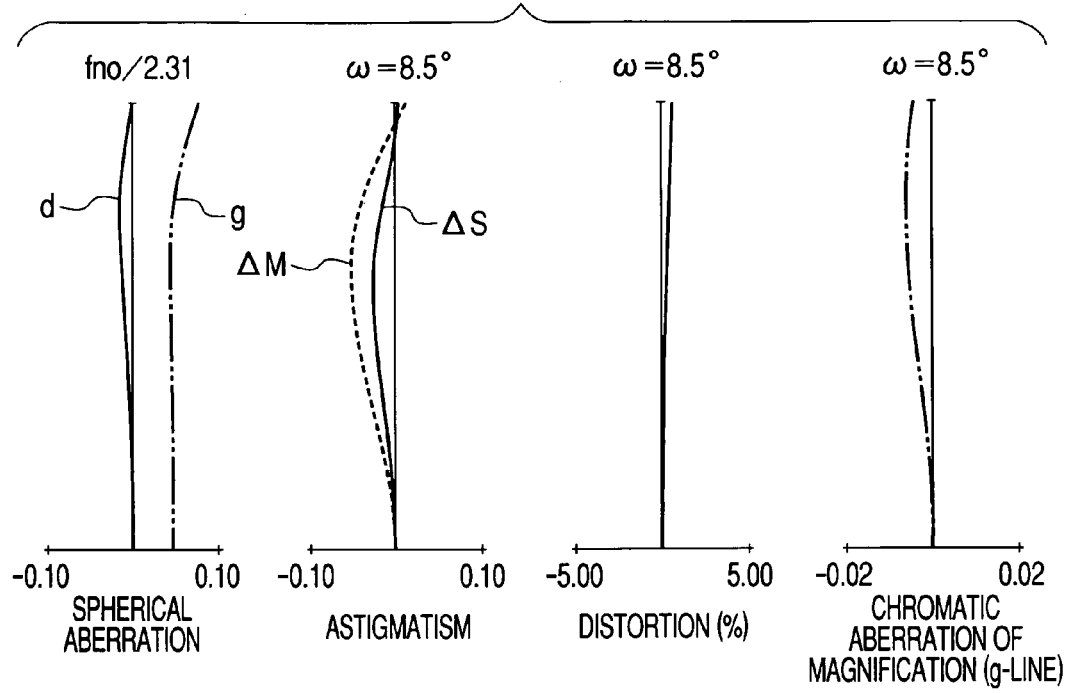
FIG. 3 illustrates various aberrations at an intermediate zoom position of the zoom lens according to Embodiment 1.
Figure 4:
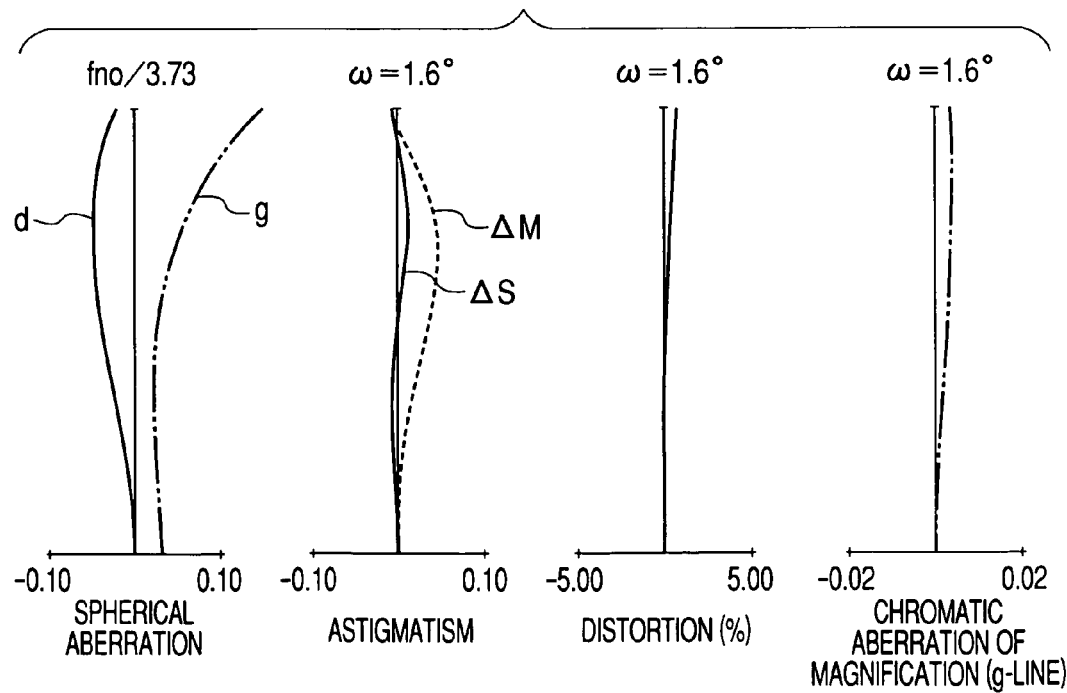
FIG. 4 illustrates various aberrations at a telephoto end of the zoom lens according to Embodiment 1.

FIG. 1 shows a lens cross section at a wide angle end of a zoom lens according to Embodiment 1 of the present invention, and FIGS. 2, 3, and 4 are aberration diagrams at the wide angle end, an intermediate zoom position, and at a telephoto end, respectively, of the zoom lens according to Embodiment 1.

Figure 7:
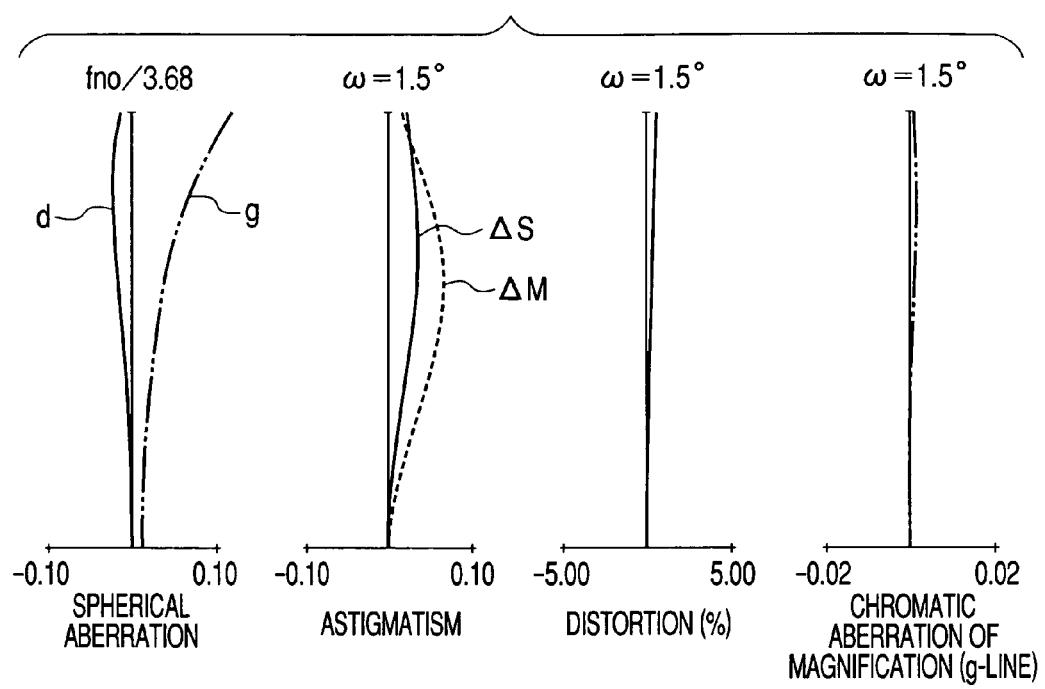
FIG. 7 illustrates various aberrations at a telephoto end of the zoom lens according to Embodiment 2.

FIGS. 5, 6, and 7 are aberration diagrams at a wide-angle end, an intermediate zoom position, and at a telephoto end, respectively, of a zoom lens according to Embodiment 2 of the present invention.

Figure 8:
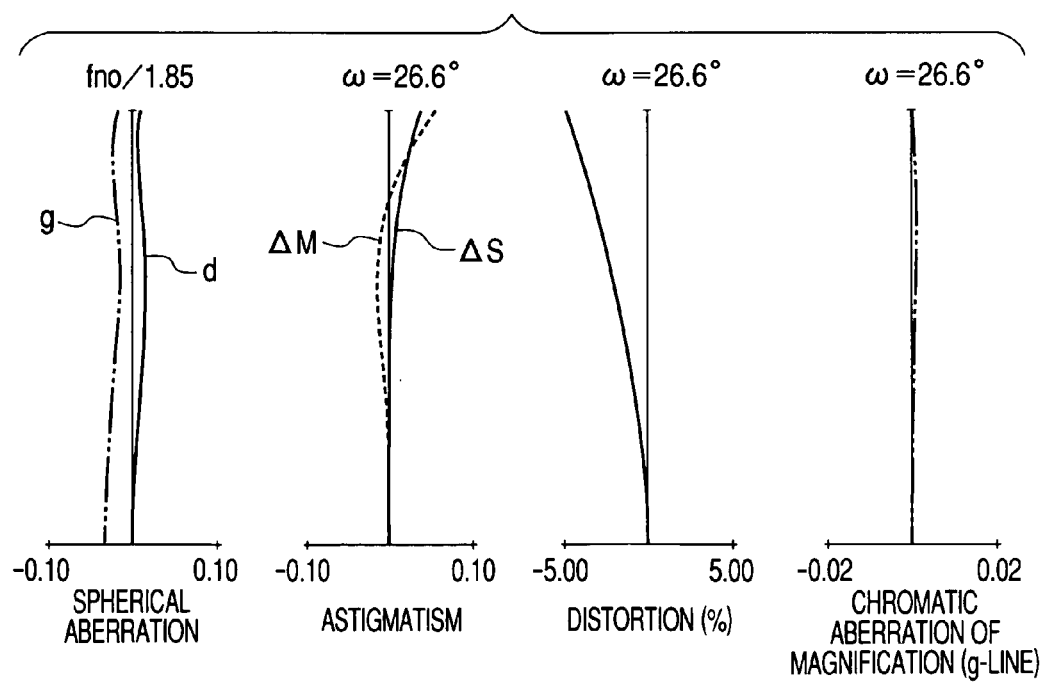
FIG. 8 illustrates various aberrations at a wide-angle end of a zoom lens according to Embodiment 3 of the present invention.
Figure 9:
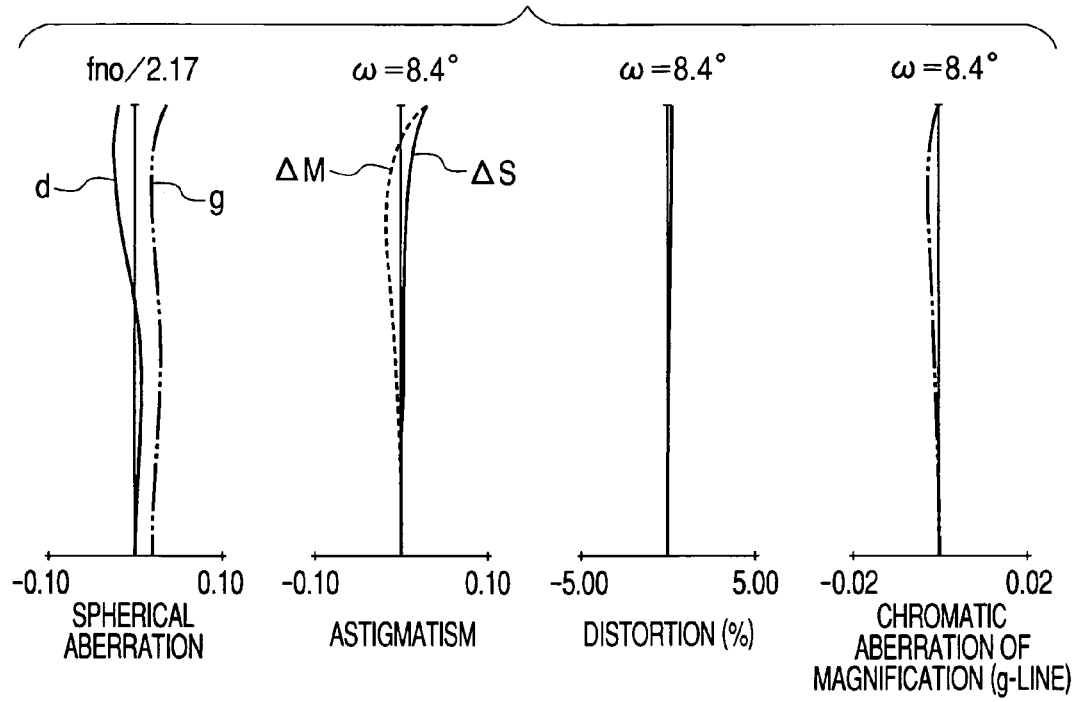
FIG. 9 illustrates various aberrations at an intermediate zoom position of the zoom lens according to Embodiment 3.
Figure 10:
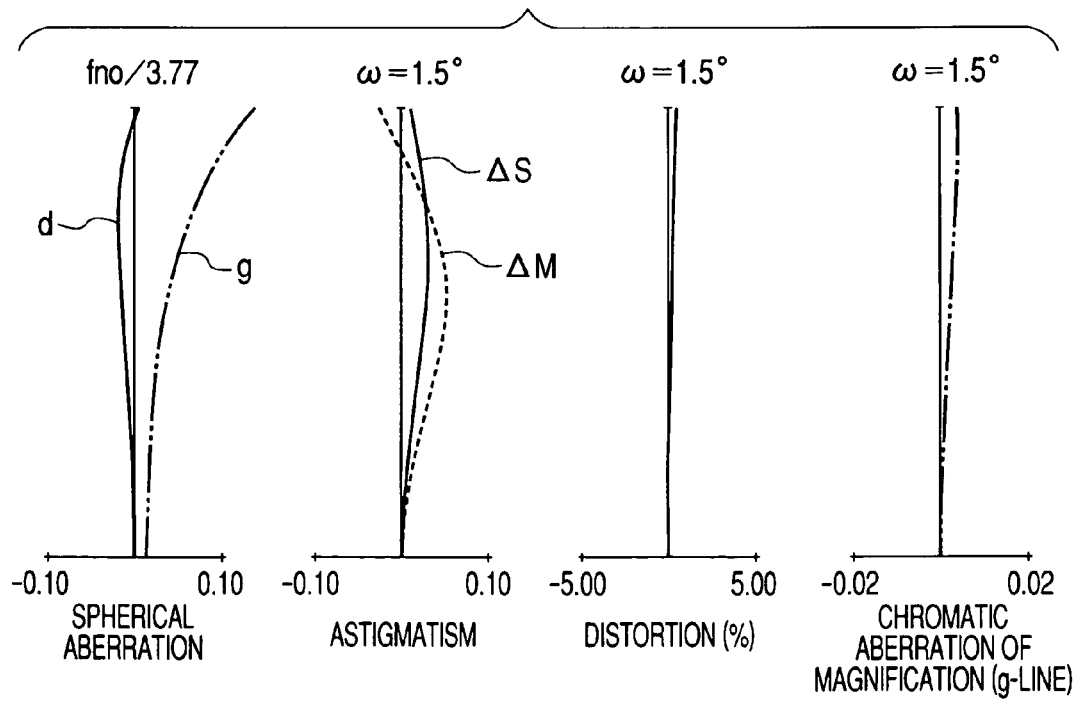
FIG. 10 illustrates various aberrations at a telephoto end of the zoom lens according to Embodiment 3.

FIGS. 8, 9, and 10 are aberration diagrams at a wide-angle end, an intermediate zoom position, and at a telephoto end, respectively, of a zoom lens according to Embodiment 3 of the present invention.

Figure 11:
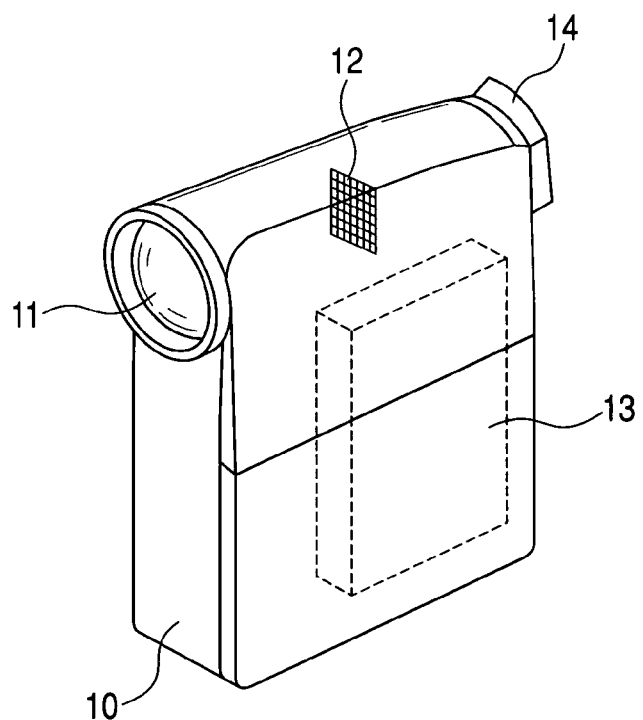
FIG. 11 is a schematic view showing the main portion of an image pickup apparatus according to the present invention.
Figure 12:
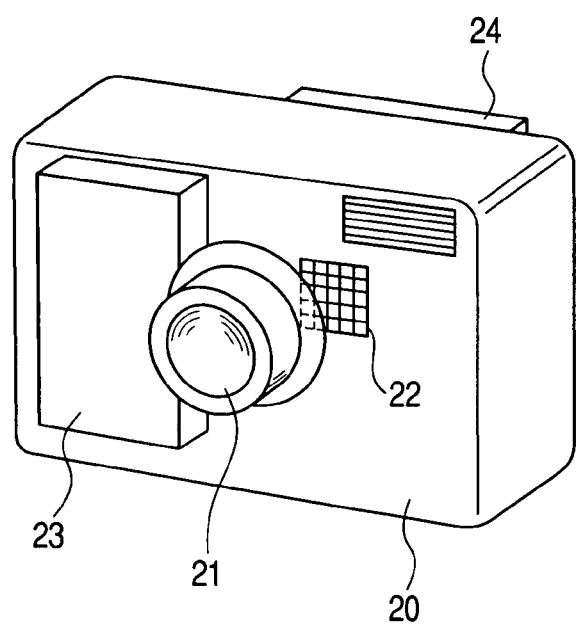
FIG. 12 is a schematic view showing the main portion of an image pickup apparatus according to the present invention.

FIG. 11 is a schematic main-portion view of a video camera (image pickup apparatus) equipped with the zoom lens of the present invention. FIG. 12 is a schematic main-portion view of a digital camera (image pickup apparatus) equipped with the zoom lens of the present invention.

The zoom lens of each embodiment is a photographing lens system used in an image pickup apparatus; as seen in its lens cross section, the left-hand side is the subject side (front), and the right-hand side is the image side (rear). In the lens cross section, symbol L1 denotes a first lens unit having a positive refractive power (optical power is equal to the reciprocal of a focal length), symbol L2 denotes a second lens unit having a negative refractive power, symbol L3 denotes a third lens unit having a positive refractive power, and symbol L4 denotes a fourth lens unit having a positive refractive power. Symbol SP denotes an aperture stop, which is disposed on the object side with respect to the third lens unit L3 and moves together with the third lens unit L3 upon zooming.

Symbol G denotes an optical block corresponding to an optical filter, a face plate, or the like. Symbol IP denotes an image plane, which corresponds to the image pickup surface of a solid-state image pickup element (photoelectric transducer) such as a CCD sensor or a CMOS sensor when the zoom lens is used as the photographing optical system of a video camera or a digital still camera, and which corresponds to the film surface in the case of a silver-halide film camera.

Referring to the aberration diagrams, d, g, ΔM, and ΔS represent d-line, a g-line, a meridional image plane, and a sagittal image plane, respectively, and chromatic aberration of magnification is indicated for g-line.

It is to be noted that in the following embodiments, the wide-angle end and the telephoto end refer to the zoom positions of a variable magnification lens unit when it is located at the opposite ends of its movement range on the optical axis that the system permits.

In the embodiments, upon zooming from the wide angle end to the telephoto end, magnification variation is effected by moving the second lens unit L2 to the image side as indicated by the arrow, and variations in image plane accompanying the variations in magnification are corrected by moving the fourth lens unit L4 along a locus convex to the object side.

Further, the rear focus system is adopted, in which focusing is effected by moving the fourth lens unit L4 on the optical axis. A solid curved line 4a and a dashed curved line 4b, each relating to the fourth lens unit L4, represent the movement loci for correcting image plane variations accompanying variations in magnification when focusing on an object at infinity and an object at short distance, respectively. By thus moving the fourth lens unit L4 along a locus convex to the object side, the space between the third lens unit L3 and the fourth lens unit L4 is efficiently utilized, thereby effectively achieving reduced total lens length.

Further, when focusing on from an object at infinity to an object at short distance at the telephoto end, the fourth lens unit L4 is moved forward as indicated by an arrow 4c. It is to be noted that while the first lens unit L1 and the third lens unit L3 are fixed in the optical axis direction for zooming and focusing, they may be moved if necessary for effecting aberration corrections.

In the zoom lens of each embodiment, the first lens unit L1 includes, in order from the object to the image sides, a cemented lens of a meniscus-shaped lens 11 having a negative refractive power and whose object-side surface is convex and a lens 12 having a positive refractive power, and a meniscus-shaped lens 13 having a positive refractive power and whose object-side surface is convex.

The second lens unit L2 includes, in order from the object to the image sides, a lens 21 having a negative refractive power in which the absolute value of its negative refractive power in the image-side surface is larger than that in the object-side surface, a lens 22 having a negative refractive power and whose object-side surface is concave, and a lens 23 having a positive refractive power in which the absolute value of its refractive power in the object-side surface is larger than that in the image-side surface. Air intervenes between the lens 22 and the lens 23.

The second lens unit L2 is configured in this way, whereby various aberrations such as field curvature or distortion of the image plane as it undergoes variations during zooming can be corrected in a satisfactory manner.

The third lens unit L3 consists of a lens 31 having a positive refractive power and whose object-side and image-side surfaces are convex, and a meniscus-shaped lens 32 having a positive refractive power and whose object-side surface is convex.

The fourth lens unit L4 consists of a cemented lens of a lens 41 having a positive refractive power and whose object-side and image-side surfaces are convex and a meniscus-shaped lens 42 having a negative refractive power and whose image-side surface is convex.

The above-described construction reduces variations in aberration occurring during focusing by means of the fourth lens unit L4.

The respective lens units are constructed as described above in the embodiments to thereby achieve miniaturization of the entire lens system, whereby high optical performance is attained over the entire magnification range and across the entire object distance by means of the simple lens construction.

Next, characteristic features of the respective embodiments other than those described above are described.

Letting f2 be the focal length of the second lens unit L2, ft be the focal length of the entire system at the telephoto zoom position, and ν23 and N23 be the Abbe number and refractive index of the material of the lens 23, respectively, they satisfy the following conditional expressions:

$$\nu 23 < 20.0 \tag{1}$$

$$N23 > 1.9 \tag{2}$$

$$-0.1 < f2/ft < -0.05 \tag{3}$$

A four-unit zoom lens which has, in order from the object side to the image side, a first lens unit having a positive refractive power, a second lens unit having a negative refractive power, a third lens unit having a positive refractive power, and a fourth lens unit having a positive refractive power, and in which the second and fourth lens units move during zooming, is frequently used in an image pickup apparatus such as a video camera or a digital camera. Miniaturization and higher magnification capability are required for the optical system used in such an image pickup apparatus.

In the four-unit zoom lens of the above zoom type, the second lens unit L2 generally consists of four lenses, that is, three lenses having a negative refractive power and one lens having a positive refractive power, or of a greater number of lenses.

In contrast, according to the invention as defined in claim 1, a high-dispersion glass material satisfying the conditional expression (1) is used as the material of the lens 23, which has a positive refractive power, of the second lens unit L2, and the conditional expressions (2) and (3) are satisfied, thereby constructing the second lens unit L2 by three lenses as a whole and reducing the chromatic aberration occurring in the second lens unit L2.

The conditional expression (1) is for effectively correcting chromatic aberrations by one lens 23 having a positive refractive power. An Abbe number exceeding the upper limit value as determined by the conditional expression (1) weakens the achromatic effect of the second lens unit L2, making it difficult to achieve higher magnification and higher performance in a compatible manner with a small number of lenses.

The conditional expression (2) is for correcting aberrations during zooming in a satisfactory manner by one lens 23 having a positive refractive power. When the refractive index of the material of the lens 23 is smaller than the range as prescribed by the conditional expression (2), it becomes difficult to correct variations in coma aberration during zooming.

The conditional expression (3) is for achieving a reduction in the total optical length while maintaining satisfactory optical performance, the expression defining the negative refractive power of the second lens unit L2. When the second lens unit L2 has a refractive power exceeding the upper limit value as determined by the conditional expression (3), this reduces the movement of the second lens unit L2 during zooming but disadvantageously involves an overall increase of the Petzval sum in the negative direction, making it difficult to correct field curvature. When, conversely, the refractive power of the second lens unit L2 is less than the lower limit value as determined by the conditional expression (3), the movement of the second lens unit L2 during zooming becomes large, making it difficult to achieve overall miniaturization of the optical system.

Note that it is further preferable to set the numerical values of the conditional expressions (1) to (3) as follows.

$$\nu 23 < 19.5 \tag{1a}$$

$$N23 > 1.91 \tag{2a}$$

$$-0.09 < f2/ft < -0.06 \tag{3a}$$

Letting D23 be the air interval between the lens 22 and the lens 23, the following conditional expression is satisfied.

$$0.1 < |D23/f2| < 0.4 \tag{4}$$

The conditional expression (4) is for correcting the coma aberrations or field curvature at the telephoto zoom position in a satisfactory manner.

If the value |D23/f2| is less than the lower limit value as determined by the conditional expression (4), positive field curvature at the telephoto zoom position increases, which disadvantageously makes it difficult to correct outward coma aberration. Conversely, if the value is greater than the upper limit value, the field curvature increases in the negative direction, which disadvantageously makes it difficult to correct inward coma aberration.

Note that it is further preferable to set the numerical range of the conditional expression (4) as follows.

$$0.15 < |D23/f2| < 0.3 \tag{4a}$$

Letting Ra be the radius of curvature of the object-side surface of the lens 23, and Rb be the radius of curvature of its image-side surface, the following conditional expression is satisfied.

$$0.9 < (Rb+Ra)/(Rb-Ra) < 2.0 \tag{5}$$

The conditional expression (5) is for correcting various aberrations in a satisfactory manner across the entire range of the zoom region by appropriately setting the lens configuration of the lens 23.

If the value (Rb+Ra)/(Rb−Ra) is less than the lower limit value as determined by the conditional expression (5), astigmatism at the wide angle zoom position disadvantageously increases in the negative direction. It is not preferable. Conversely, if the value is greater than the upper limit, astigmatism at the wide-angle zoom position disadvantageously increases in the positive direction. It is also not preferable.

It is further desirable to set the numerical range of the conditional expression (5) as follows to achieve even more enhanced optical performance.

$$1.0 < (Rb+Ra)/(Rb-Ra) < 1.7 \quad (5a)$$

Letting N21 and N22 be the refractive indices of the materials forming the lens 21 and the lens 22, respectively, the following conditional expression is satisfied.

$$(N21+N22)/2 > 1.67 \quad (6)$$

The conditional expression (6) is for preventing excessive correction of field curvature in sagittal image plane due to an increase the Petzval sum in the positive direction upon increasing the refractive index of the material forming the lens 23, thereby reducing deterioration in the optical performance.

When the respective refractive indices of the materials forming the lens 21 and the lens 22 are less than the lower limit value as determined by the conditional expression (6), the Petzval sum increases in the negative direction, which disadvantageously makes it difficult to correct field curvature in sagittal image plane. Therefore, it is not preferable.

It is further preferable to set the numerical values of the conditional expression (6) as follows.

$$(N21+N22)/2 > 1.73 \quad (6a)$$

Letting R2a be the radius of curvature of the object-side surface of the lens 22, and R2b be the radius of curvature of its image-side surface, the following expression is satisfied.

$$-0.4 < (R2b+R2a)/(R2b-R2a) < 0.4 \quad (7)$$

If the value $(R2b+R2a)/(R2b-R2a)$ is less than the lower limit of the conditional expression (7), it disadvantageously causes an increase in the positive direction of astigmatism at the wide-angle zoom position. Conversely, if the value is greater than the upper limit, it disadvantageously causes an increase in astigmatism in the negative direction at the wide-angle zoom position. It is not preferable.

It is further preferable to set the numerical range of the conditional expression (7) as follows.

$$-0.3 < (R2b+R2a)/(R2b-R2a) < 0.2 \quad (7a)$$

Numerical Embodiments 1 to 3, respectively corresponding to Examples 1 to 3, are described below. In the numerical examples, i denotes the order of each surface in order from the object side, Ri denotes the radius of curvature of each surface, Di denotes the thickness of member or air interval between the i-th surface and the (i+1)-th surface, and Ni and υi respectively denote the refractive index and the Abbe number with respect to the d-line. Further, in Numerical Embodiments 1 to 3, the two surfaces located at the most image side are surfaces each corresponding to a crystal low-pass filter, an infrared cut filter, or the like. Letting X be the displacement in the optical axis direction at a height H from the optical axis with the plane vertex taken as a reference, an aspherical surface is represented as follows:

$$x = \frac{(1/R)h^2}{1+\sqrt{(1-(1+k)(h/R)^2)}} + \frac{+Bh^4 + Ch^6 + Dh^8 + Eh^{10} + Fh^{12} +}{A'h^3 + B'h^5 + C'h^7 + D'h^9 + E'h^{11}},$$

where R represents the paraxial radius of curvature, k represents the conic constant, and A', B, B', C, C', D, D', E, E', and F represent the aspheric coefficients.

Further, [e-X] means "×10$^{-X}$". f represents the focal length, Fno represents the F number, and ω represents the half field angle. Further, the relationship between the above-described conditional expressions and the various numerical values in Numerical Embodiments is given in Table 1.

| Numerical Embodiment 1 | | | |
|---|---|---|---|
| f = 3.73 to 73.85 | Fno = 1.85 to 3.64 | | 2ω = 56.4° to 3.1° |
| R1 = 39.186 | D1 = 1.20 | N1 = 1.846660 | ν1 = 23.9 |
| R2 = 21.028 | D2 = 4.90 | N2 = 1.603112 | ν2 = 60.6 |
| R3 = −417.918 | D3 = 0.20 | | |
| R4 = 19.953 | D4 = 2.80 | N3 = 1.696797 | ν3 = 55.5 |
| R5 = 58.070 | D5 = Variable | | |
| R6 = 26.992 | D6 = 0.80 | N4 = 1.882997 | ν4 = 40.8 |
| R7 = 6.110 | D7 = 2.10 | | |
| R8 = −12.454 | D8 = 0.70 | N5 = 1.772499 | ν5 = 49.6 |
| R9 = 7.441 | D9 = 0.90 | | |
| R10 = 9.664 | D10 = 1.75 | N6 = 1.922860 | ν6 = 18.9 |
| R11 = 37.556 | D11 = Variable | | |
| R12 = Stop | D12 = 1.50 | | |
| R13 = 7.538 | D13 = 3.80 | N7 = 1.583126 | ν7 = 59.4 |
| R14 = −27.639 | D14 = 0.20 | | |
| R15 = 11.506 | D15 = 0.70 | N8 = 1.846660 | ν8 = 23.9 |
| R16 = 6.628 | D16 = Variable | | |
| R17 = 12.208 | D17 = 3.30 | N9 = 1.517417 | ν9 = 52.4 |
| R18 = −6.388 | D18 = 0.70 | N10 = 1.846660 | ν10 = 23.9 |
| R19 = −11.262 | D19 = Variable | | |
| R20 = ∞ | D20 = 2.62 | N11 = 1.516330 | ν11 = 64.1 |
| R21 = ∞ | | | |

| | Focal Length | | |
|---|---|---|---|
| Variable Interval | 3.73 | 24.00 | 73.85 |
| D5 | 0.60 | 14.87 | 18.90 |
| D11 | 20.30 | 6.03 | 2.00 |
| D16 | 8.00 | 3.26 | 10.49 |
| D19 | 4.90 | 9.64 | 2.41 |

Aspherical Coefficient

| | | | |
|---|---|---|---|
| R13 | k = −8.36549e−1 | A' = 5.99648e−5 | B' = −5.66319e−6 |
| | C' = 8.04577e−7 | D' = −4.37113e−8 | E' = 7.82311e−10 |
| R14 | k = −6.26116e+01 | A' = −1.10778e−4 | B' = −5.06022e−5 |
| | C' = 5.45208e−6 | D' = −2.67048e−7 | E' = 4.93758e−9 |

| Numerical Embodiment 2 | | | |
|---|---|---|---|
| f = 2.90 to 62.60 | Fno = 1.85 to 3.68 | | 2ω = 53.1° to 3.1° |
| R1 = 34.936 | D1 = 0.99 | N1 = 1.846660 | ν1 = 23.9 |
| R2 = 18.442 | D2 = 3.50 | N2 = 1.603112 | ν2 = 60.6 |
| R3 = −228.460 | D3 = 0.15 | | |
| R4 = 16.847 | D4 = 2.35 | N3 = 1.696797 | ν3 = 55.5 |
| R5 = 44.802 | D5 = Variable | | |
| R6 = 38.218 | D6 = 0.65 | N4 = 1.834000 | ν4 = 37.2 |
| R7 = 4.093 | D7 = 1.57 | | |
| R8 = −9.380 | D8 = 0.60 | N5 = 1.696797 | ν5 = 55.5 |
| R9 = 9.580 | D9 = 0.90 | | |
| R10 = 10.260 | D10 = 1.50 | N6 = 1.922860 | ν6 = 18.9 |
| R11 = 77.484 | D11 = Variable | | |
| R12 = Stop | D12 = 0.80 | | |
| R13 = 7.139 | D13 = 3.50 | N7 = 1.524700 | ν7 = 56.2 |
| R14 = −18.753 | D14 = 0.13 | | |
| R15 = 8.945 | D15 = 0.60 | N8 = 1.846660 | ν8 = 23.9 |
| R16 = 5.811 | D16 = Variable | | |
| R17 = 9.307 | D17 = 2.80 | N9 = 1.516330 | ν9 = 64.1 |
| R18 = −5.612 | D18 = 0.55 | N10 = 1.805181 | ν10 = 25.4 |
| R19 = −10.444 | D19 = 2.00 | | |
| R20 = ∞ | D20 = 2.92 | N11 = 1.516330 | ν11 = 64.2 |

-continued

R21 = ∞

|  | Focal Length | | |
|---|---|---|---|
| Variable Interval | 2.90 | 18.23 | 62.60 |
| D5 | 0.66 | 13.48 | 17.10 |
| D11 | 18.64 | 5.81 | 2.19 |
| D16 | 8.06 | 4.48 | 10.07 |

Aspherical Coefficient

R13  k = −2.73676   B = 6.42726e−4   C = −2.08804e−5
     D = −6.98888e−7   E = 6.82311e−08   F = −2.47029e−09
R14  k = −3.23379   B = 2.48150e−4   C = −3.91968e−5
     D = 1.06317e−6   E = 1.98508e−10   F = −1.45553e−9

Numerical Embodiment 3
f = 2.90 to 62.60   Fno = 1.85 to 3.77   2ω = 53.1° to 3.1°

| R1 = 33.919 | D1 = 0.99 | N1 = 1.846660 | ν1 = 23.9 |
| R2 = 17.942 | D2 = 3.50 | N2 = 1.603112 | ν2 = 60.6 |
| R3 = −231.623 | D3 = 0.15 | | |
| R4 = 16.517 | D4 = 2.35 | N3 = 1.696797 | ν3 = 55.5 |
| R5 = 43.914 | D5 = Variable | | |
| R6 = 15.625 | D6 = 0.65 | N4 = 1.806098 | ν4 = 40.9 |
| R7 = 4.240 | D7 = 1.88 | | |
| R8 = −6.711 | D8 = 0.60 | N5 = 1.693501 | ν5 = 53.2 |
| R9 = 7.324 | D9 = 0.90 | | |
| R10 = 9.525 | D10 = 1.50 | N6 = 1.922860 | ν6 = 18.9 |
| R11 = 45.801 | D11 = Variable | | |
| R12 = Stop | D12 = 0.80 | | |
| R13 = 7.502 | D13 = 3.50 | N7 = 1.583126 | ν7 = 59.4 |
| R14 = −21.532 | D14 = 0.13 | | |
| R15 = 8.972 | D15 = 0.60 | N8 = 1.846660 | ν8 = 23.9 |
| R16 = 5.927 | D16 = Variable | | |
| R17 = 9.190 | D17 = 2.80 | N9 = 1.516330 | ν9 = 64.1 |
| R18 = −5.453 | D18 = 0.55 | N10 = 1.805181 | ν10 = 25.4 |
| R19 = −10.112 | D19 = 2.00 | | |
| R20 = ∞ | D20 = 2.92 | N11 = 1.516330 | ν11 = 64.2 |
| R21 = ∞ | D21 = 0.00 | | |
| R22 = ∞ | | | |

|  | Focal Length | | |
|---|---|---|---|
| Variable Interval | 2.90 | 18.59 | 62.60 |
| D5 | 0.66 | 12.88 | 16.32 |
| D11 | 17.33 | 5.12 | 1.67 |
| D15 | 8.04 | 4.06 | 9.53 |

Aspherical Coefficient

R13  k = −2.92179   B = 6.52549e−4   C = −1.76137e−5
     D = −4.33757e−7   E = 6.90403e−8   F = −2.47029e−9
R14  k = −3.04183   B = 3.15051e−4   C = −3.07169e−5
     D = 1.08332e−6   E = 1.98508e−10   F = −1.45553e−9

TABLE 1

|  | Numerical Embodiment | | |
|---|---|---|---|
| Conditional Expression | 1 | 2 | 3 |
| (1) ν23 | 18.9 | 18.9 | 18.9 |
| (2) N23 | 1.92286 | 1.92286 | 1.92286 |
| (3) f2/f2t | −0.0641 | −0.0656 | −0.0607 |
| (4) |D23/f2| | 0.190 | 0.219 | 0.237 |
| (5) (Rb + Ra)/(Rb − Ra) | 1.693 | 1.305 | 1.525 |
| (6) (N21 + N22)/2 | 1.828 | 1.765 | 1.750 |
| (7) (R2b + R2a)/(R2b − R2a) | −0.252 | 0.011 | 0.044 |

Next, embodiments of a video camera and a digital still camera which use the zoom lens of the present invention as the photographing optical system are described with reference to FIGS. 11 and 12, respectively.

Referring to FIG. 11, reference numeral 10 denotes a video camera main body, reference numeral 11 denotes a photographing optical system consisting of the zoom lens of the present invention, reference numeral 12 denotes a solid-state image pickup element (photoelectric transducer) such as a CCD sensor or a CMOS sensor that receives a subject image taken by the photographing optical system 11, reference numeral 13 denotes a memory storing information corresponding to the subject image photoelectrically converted by the image pickup element 12, and reference numeral 14 denotes a finder for observing the subject image displayed on a display element (not shown). The display element consists of a liquid crystal panel or the like, on which the subject image formed on the image pickup element 12 is displayed.

Next, an embodiment of a digital still camera is described with reference to FIG. 12.

Referring to FIG. 12, reference numeral 20 denotes a camera main body, reference numeral 21 denotes a photographing optical system consisting of the zoom lens as described in any one of Embodiments 1 to 3, reference numeral 22 denotes a solid-state image pickup element (photoelectric transducer) such as a CCD sensor or a CMOS sensor for receiving a subject image formed by the photographing optical system 21, reference numeral 23 denotes a memory storing information corresponding to the subject image photoelectrically converted by the solid-state image pickup element 22, and reference numeral 24 denotes a finder for observing the subject image formed on the solid-state image pickup element 22, the finder consisting of a liquid crystal display panel or the like.

As described above, by applying the zoom lens of the present invention to the image pickup element of a video camera, a digital still camera, or the like, it is possible to realize an image pickup apparatus that is compact and has high optical performance.

This application claims priority from Japanese Patent Application No. 2004-052204 filed on Feb. 26, 2004, which is hereby incorporated by reference herein.

What is claimed is:

1. A zoom lens comprising, in order from an object side to an image side:
   a first lens unit having positive optical power;
   a second lens unit having negative optical power;
   a third lens unit having positive optical power; and
   a fourth lens unit having positive optical power,
   wherein the second lens unit and the fourth lens unit move during zooming,
   wherein the second lens unit consists of, in order from the object side to the image side, a lens 21 having a negative refractive power in which absolute value of refractive power in an image-side surface is larger than that in an object-side surface, a lens 22 having a negative refractive power and whose object-side surface is concave, and a lens 23 having a positive refractive power in which absolute value of refractive power in an object-side surface is larger than that in an image-side surface, and wherein with air intervening between the lens 22 and the lens 23, the following condition is satisfied:

$$\nu 23 < 20.0,$$

$$N23 > 1.9,$$

$$-0.1 < f2/ft < -0.05,$$

where f2 represents a focal length of the second lens unit, ft represents a focal length of the entire system at a telephoto end zoom position, and $\nu 23$ and N23 represent an Abbe number and a refractive index of a material forming the lens 23, respectively.

2. A zoom lens according to claim 1, wherein the following condition is satisfied:

$$0.1 < |D23/f2| < 0.4,$$

where D23 represents an air interval between the lens 22 and the lens 23.

3. A zoom lens according to claim 1, wherein the following condition is satisfied:

$$0.9 < (Rb+Ra)/(Rb-Ra) < 2.0,$$

where Ra represents a radius of curvature of the object-side surface of the lens 23, and Rb represents a radius of curvature of the image-side surface thereof.

4. A zoom lens according to claim 1, wherein the following condition is satisfied:

$$(N21+N22)/2 > 1.67,$$

where N21 and N22 represent respective radii of curvature of materials forming the lens 21 and the lens 22.

5. A zoom lens according to claim 1, wherein the first lens unit and the third lens unit don't move during zooming.

6. A zoom lens according to claim 1, wherein the following condition is satisfied:

$$0.4 < (R2b+R2a)/(R2b-R2a) < 0.4,$$

where R2a represents a radius of curvature of the object-side surface of the lens 22, and R2b represents a radius of curvature of the image-side surface thereof.

7. A zoom lens according to claim 1, wherein the zoom lens forms an image on a solid-state image pickup element.

8. An image pickup apparatus comprising:

the zoom lens as set forth in claim 1; and a solid-state image pickup element that receives an image formed by the zoom lens.

* * * * *